United States Patent [19]

Sugimoto

[11] 4,098,556
[45] Jul. 4, 1978

[54] HOLE MAKING POSITION CONTROL UNIT WITH A MARKED PLATE FOR A HOLE MAKING MACHINE

[75] Inventor: Tadahiro Sugimoto, Amagasaki, Japan

[73] Assignee: Daito Seiki Company, Limited, Osaka, Japan

[21] Appl. No.: 731,923

[22] Filed: Oct. 13, 1976

[30] Foreign Application Priority Data

| Oct. 13, 1975 | [JP] | Japan | 50-123516 |
| Oct. 13, 1975 | [JP] | Japan | 50-123517 |
| Oct. 13, 1975 | [JP] | Japan | 50-123518 |
| Oct. 14, 1975 | [JP] | Japan | 50-124000 |

[51] Int. Cl.² ............... B23B 39/08; B23B 39/24; B23B 39/26
[52] U.S. Cl. ............................................. 408/3
[58] Field of Search ................................ 408/3

[56] References Cited

U.S. PATENT DOCUMENTS

| 3,163,057 | 12/1964 | Drummond et al. | 408/3 |
| 3,232,142 | 2/1966 | Deckl et al. | 408/3 |
| 3,532,893 | 10/1970 | Marantette et al. | 408/3 |
| 3,712,750 | 1/1973 | Healy | 408/3 |

*Primary Examiner*—Willie G. Abercrombie
*Attorney, Agent, or Firm*—J. Harold Nissen

[57] ABSTRACT

A hole making position control unit for a hole making machine suitable for making rivet holes and bolt holes in shaped steel. This control unit mainly comprises a marked plate having marks thereon, a photoelectrical apparatus for detecting the mark and a hole making head interlocked with the photoelectrical apparatus, and controls the action of the hole making head in accordance with the arrangement of the marks, which are arranged at the positions corresponding to the centers of holes to be made and to the turning positions of the moving direction of the hole making head. Each mark has a width to be detected in the detecting direction of the photoelectrical apparatus, so that during the detection of the mark the hole making head is instructed to decelerate, and when the detection is finished the hole making head is instructed to stop.

10 Claims, 7 Drawing Figures

HOLE MAKING POSITION CONTROL UNIT WITH A MARKED PLATE FOR A HOLE MAKING MACHINE

BACKGROUND OF THE INVENTION

This invention relates to a hole making position control unit for an automatic hole making machine tool, especially for a drilling machine for drilling rivet holes and/or bolt holes in shaped steel, including H-shape steel and L-shaped steel.

Conventionally, a numerical control system has also been adopted as a positioning control system for machine tools. This prior art system uses a punched tape, a magnetic tape or the like at an input part or at a program control part of the computer to give a series of operation instructions according to information recorded on a tape. This system, however, has such disadvantages that operators at fieldwork are unable to read the recorded information on a magnetic tape with the naked eye, and it is very difficult to make out a new program tape. Thus, this system is not necessarily suitable for the multi-kind small production. Moreover, in order to name a tool post move promptly to the fixed position and stop exactly at the tool post, it is necessary to decelerate the tool post at a certain point so as to make it draw closer to the stop position at a slow speed and stop there without any overrunning error due to inertia of a body in motion. For this purpose, several means have been adopted, for example, means for recording the information corresponding to each of a decelerating point and a stationary point, switch means of detecting a deceleration point and a stationary point spaced apart from each other, and the like. However, these means have a disadvantage in like. However, these means have a disadvantage in that they require complicated devices. Furthermore, the conventional hole making machine for shaped steel has employed the system of feeding shaped steel to a fixed hole making head. According to this system, therefore, not only is a large quantity of electric power and a large-sized device needed for feeding heavy shape steel, but also high precision of positioning cannot be realized in moving a heavy material to be processed because of inertia. In addition to the above, since a material to be processed is moved during operation, hole-making operations from three processing directions i.e., from the left side, from the right side and from the top side cannot be carried out independently.

OBJECT OF THE INVENTION

A primary object of the present invention is to provide a hole making position control unit for a hole making machine suitable for making holes in shaped steel and splice plates to be fixed thereto.

Another object of the present invention is to provide a hole making position control unit, the contents of which can be appreciated by operators at fieldwork with the naked eye, which is simple in construction, easy to handle and low in cost.

A further object of the present invention is to provide an efficient hole making position control unit which gives instructions to the hole making head to decelerate and stop the movement thereof.

A still further object of the present invention is to provide an automatic hole making machine which is lighter in the mass of its movable part to minimize overrunning.

Other objects and advantages of the present invention will be apparent from the following description made with reference to the accompanying drawings, in which.

DETAILED DESCRIPTION OF THE INVENTION

The hole making position control unit according to the present invention comprises a base bed, a vice table fixed on the base bed, a stationary marked plate having mark thereon, and a phtoelectric apparatus which interlocks with a hole making head. The hole marking head is driven along the surface of the marked plate for controlling the hole making position. A material to be processed such as shaped steel is placed fixedly on the vice table. The mark are provided on the marked plate at the positions corresponding to the centers of the holes to be made and the turning positions to turn the moving direction of the hole making head. The deceleration of the hole making head is instructed at the position of starting the mark detection, and the stop of the movement of the hole making head is instructed at the position where the mark detection is finished. This control unit can be installed at three sides, i.e., on the upper side, the left side and the right side, each for action independent from each other.

Figure 1:
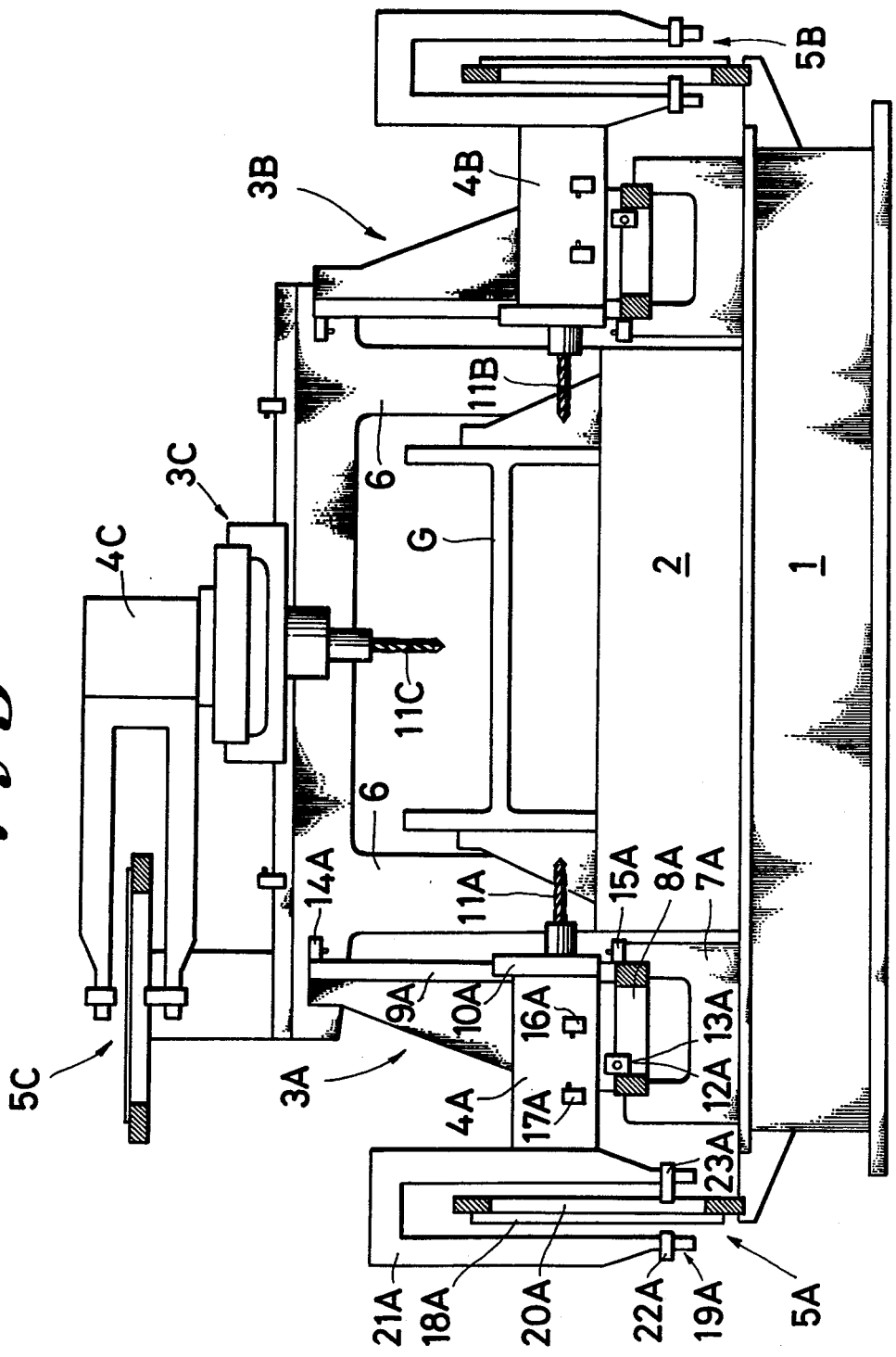
FIG. 1 is a front view of a drilling machine coupled with a hole making position control unit embodying the present invention.

Referring now to the drawings, which show a preferred embodiment of the hole making position control unit of the present invention coupled with a drilling machine as an example of a hole making machine tool, first to FIG. 1, a vice table 2 is fixed on the central part of a base bed 1. Placed fixedly on the vice table 2 is a material G to be processed. Installed to the left of the material G are the left cross-slide device 3A for processing the left side of the material G, the left hole making head 4A mounted thereon and the left hole making position control device 5A. Installed to the right of the material G are the right cross-slide device 3B for making holes on the right side of the material G, the right hole making head 4B and the right hole making position control device 5B. Installed above the material G are the upper cross-slide device 3C for making holes on the material G from above, the upper hole making head 4C and the upper hole making position control device 5C, all resting on props 6,6. Basically, the three cross-slide devices 3A, 3B and 3C have the same mechanism, with the exception that while the left cross-slide device 3A and the right cross-slide device 3B slide on an X - Y plane, the upper cross-slide device slides on X an X-Z plane. These planes are defined by the X-, Y- and the X-, Z-directions, respectively, which will be referred to hereinafter. Therefore, in FIG. 1 the same number is given to equivalent parts of the three cross-slide devices, with A, B and C appended to the left equivalent, the right equivalent and the upper equivalent respectively.

Figure 7:
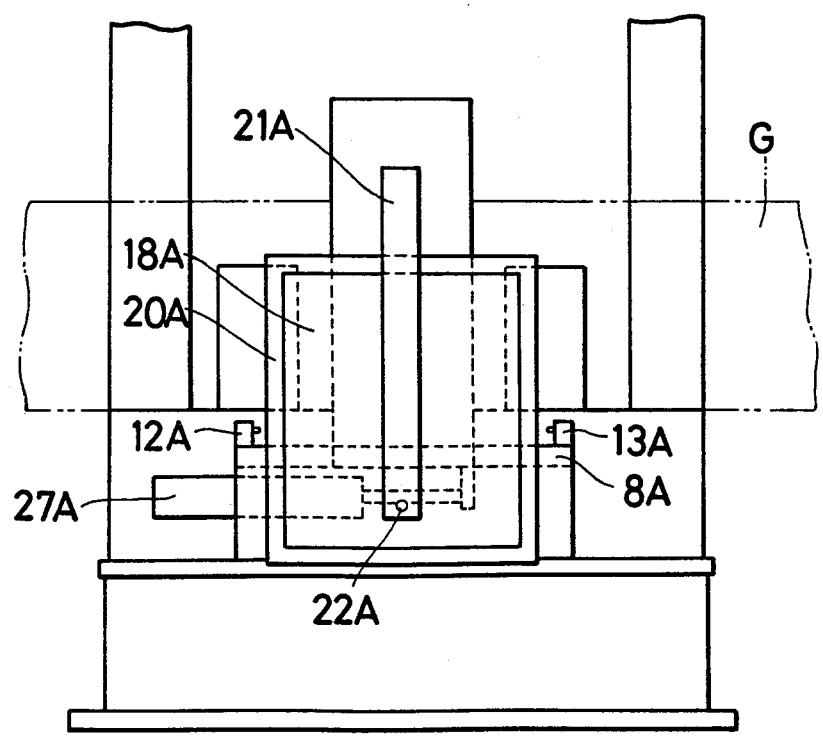
FIG. 7 is a left side view of the drilling machine of FIG. 1.

Referring to FIGS. 1 and 7, the cross-slide device 3A includes an X-rail bed 7A fixed to the base bed 1, an X-slide saddle 8A slidably mounted on the X-rail bed 7A to slide along the X-direction, i.e., the direction which is horizontal and at right angles to the spindle of a drill 11A, a Y-rail bed 9A fixed to the X-slide saddle 8A, and a Y-slide saddle 10A slidably mounted on the Y-rail bed 9A to slide along the Y-direction, i.e., the vertical direction.

The Y-slide saddle 10A is provided with the hole making head 4A comprising the drill 11A which is spinned or rotated by an electric motor (not shown) is a conventional manner and advances or returns in the axial direction of the drill, i.e., the Z-direction. An oil pressure cylinder 27A is fixed to the X-rail bed 7A so as to drive the X-slide saddle 8A along the X-direction. Similarly, another oil pressure cylinder 28 (see FIG. 3) is fixed to the Y-rail bed 9A so as to drive the Y-slide saddle 10A. In order to detect that the X-slide saddle 8A and the Y-slide saddle 10A are on the limit positions on one end of the X-rail bed and the Y-rail bed, respectively, a pair of X-limit switches 12A, 13A and a pair of Y-limit switches 14A, 15A are mounted on the X-rail bed 7A and the Y-rail bed 9A, respectively. Also, a pair of Z-limit switches 16A, 17A are mounted on the hole making head 4A in order to detect that the drill 11A is on the limit position either in its forward or backward movement.

A X-direction limit switch 12A which is fitted to the X-rail bed gives a limitation signal $LX_1$ when the X-slide saddle is at a frontside limit position. For making it possible to carry out operation of making holes in symmetrical arrangement by fitting a marked plate 18A face inwards, the X-direction limit switch 13A is fitted to the back side limit position to give a limitation signal $LX_2$. The Y-direction limit switch 14A fixed to the upper end of the Y-rail bed 9A provides a limitation signal $LY_1$ when the Y-slide saddle is at the upward limit position. Fixed to the downward limit position of the Y-slide bed is the Y-direction limit switch 15A which gives a limitation signal $LY_2$. The Z-direction limit switches 16A and 17A are in the hole making head, giving a limitation signal $LZ_1$ to indicate the finish of hole making and a limitation signal $LZ_2$ to indicate the restoration of the drill 11A to the original state respectively. The cross-slide devices 3B, 3C, and the drills 11B, 11C are controlled in the same manner as the cross-slide device 3A and the drill 11A, respectively.

The hole making position control unit 5A which determines X, Y positions of the cross-slide device 3A is actuated by co-working of the marked plate 18A and a mark detector 19A. The hole making control unit 5A includes a detector frame 21A carrying the mark detector 19A comprising a light emitting element 22 and a photodetecting element 23 and producing a light receiving signal P, which is used, for example, as a continuous mark signal. More particularly a plate frame 20A is installed fixedly to the plane which makes a right angle with the base bed 1 or the X-rail bed 7A. The marked plate 18A is removably fitted to this plate frame 20A. The position at which the marked plate is fitted to the plate frame can be fine-adjusted in the X-direction or Y-direction independently by means of screws fitted to the base and both sides of the plate frame 20A. The detector frame 21A is fixed to the hole making head 4A, with the marked plate 18A sandwiched therebetween. To one end of the detector frame 21A is fitted the light emitting element 22A and to the other end is fitted a photodetecting element 23A, and the light receiving signal from the photo detecting element 23A, or the continuous mark signal, is led to a circuit device 24 via a lead wire, see FIG. 3.

The marked plate 18A has marks thereon which correspond to stop positions and turning positions of the hole making head. In this embodiment, it is a thin metal sheet having holes to let light pass therethrough, but this plate can be a transparent plastic sheet having opaque marks. A black sheet having chips thereon for reflection purpose can also be used in conjunction with a mark detector sensing the reflection.

An explanation is given below on the principle of positioning control by means of the marked plate 18, with reference to FIG. 2. The mark V having a width b in the detecting direction X is made in the plate. If the scanning direction is as shown by an arrow, the point A corresponds to the stop instruction position and the point B corresponds to the deceleration instruction position.

Figure 2:
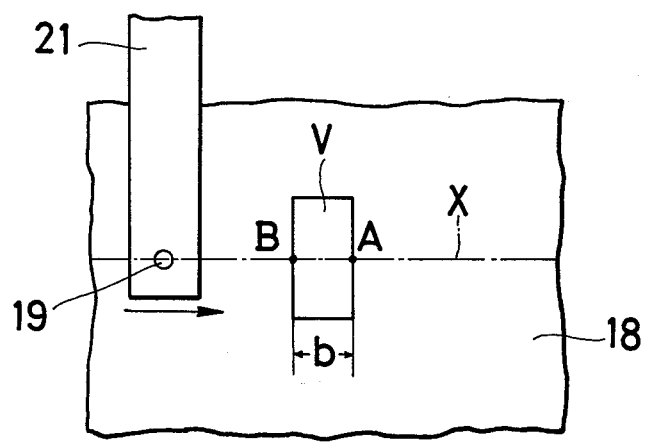
FIG. 2 is a diagram illustrating the principle of positioning control by means of a marked plate according to the present invention.
Figure 3:
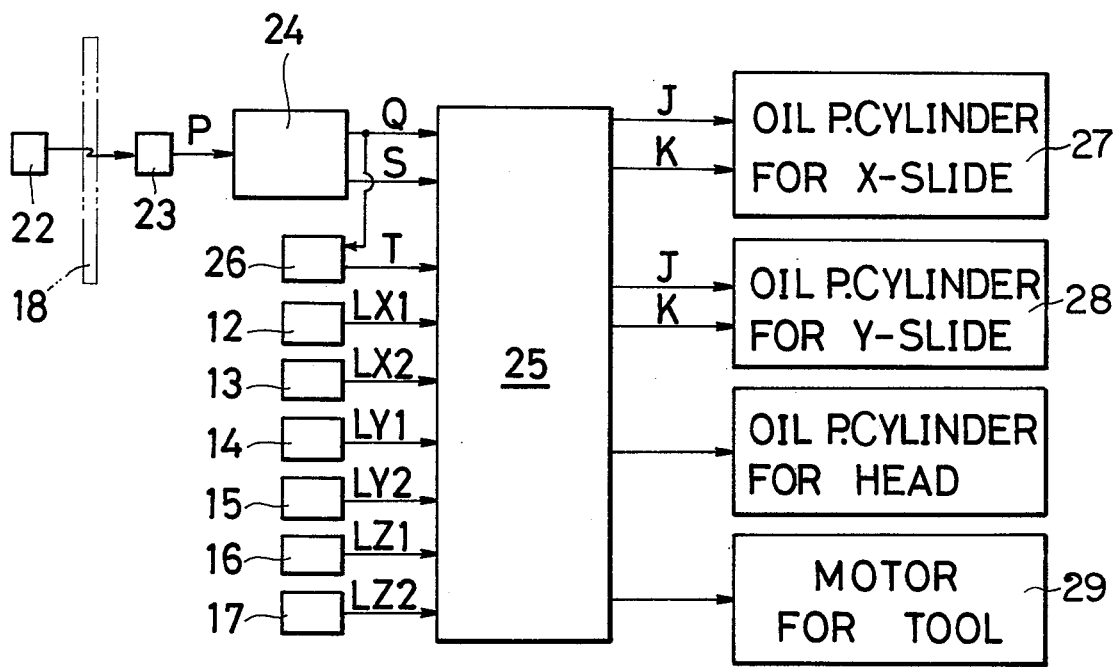
FIG. 3 is a block diagram of photoelectrical and electrical controls of the apparatus shown in FIG. 1.
Figure 4:
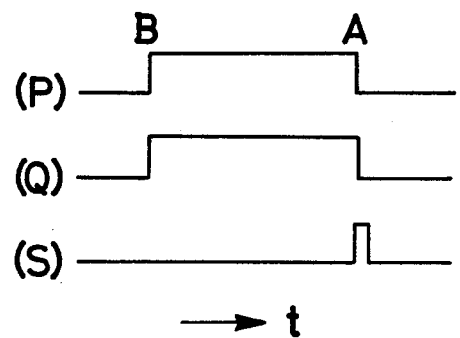
FIG. 4 is a time-chart explaining the operation of the apparatus shown in FIG. 3.

FIG. 3 is a block diagram of the electric circuit for the mark detection in FIG. 2. The light receiving signal P from the photo detecting element 23 which receives light from the light emitting element 22 is put in the circuit device 24, where a mark detecting signal Q is produced in response to the mark signal, and a detection-finished signal S is also produced in response to cessation or termination of the mark signal. These signals Q and S can be generated by various methods on the basis of conventional circuit technique, for example, the light receiving signal P is used as it is as the signal Q, and the signal S is obtained by an AND of complement $\bar{Q}$ of signal Q and signal Q' lagging slightly behind the signal Q, i.e., $\bar{Q} \cdot Q'$. A circuit for this purpose can be realized by transistors, integrated circuits, relay circuits, or the like. On the basis of the above-mentioned signal Q, a controlling valve for deceleration of the oil pressure control unit is actuated, and a controlling valve for stopping is in turn actuated on the basis of the above-mentioned signal S. In the case where the feed screw driven by an electric motor is used instead of an oil pressure control, similar operation can be done by the deceleration and stop of the electric motor. The limitation signals $LX_1$, $LX_2$, $LY_1$, $LY_2$, $LZ_1$ and $LZ_2$ of the limit switches 12, 13 relating to the X-direction, the limit switch-s 14, 15 relating to the Y-direction and the limit switches 16, 17 relating to the Z-direction, respectively, and an output signal T as an example of a return signal from a return signal means or a discriminating means such as a timer device 26, as well as the mark detecting signal Q and detection-finished signal S, are put in a control part 25.

This control unit 25 drives and controls the cross-slide unit 3 and the hole making head 4 in accordance with the following logic. As aforementioned, deceleration is effected by the signal Q, and stopping by signal S. Now, when the signal $LX_1$ (or $LX_2$) is generated and the signal S is detected at the point A in FIG. 2, the change of direction from Y-direction to X-direction is effected. When no other signal is put out at the time of detection of the S signal, a hole making operation is started, and when the hole making operation is finished with restoration of the drill to its original position, the detection along the X-direction is started again. When the signal T is put out at the time of travelling at a slow speed, the forward stroke is changed over to the return stroke and the cross-slide device returns to the forward limit position, irrespective of the marks. When the signal $LX_1$ (or $LX_2$) detects the finish of a return stroke in X-direction, directional change from X-direction to Y-direction is made, and when the signal $LY_1$ showing the upper limit of Y-direction is detected, the stroke is changed over to return stroke in Y-direction, the cross-slide device being reinstated to its starting position, irrespective of the marks.

Figure 5:
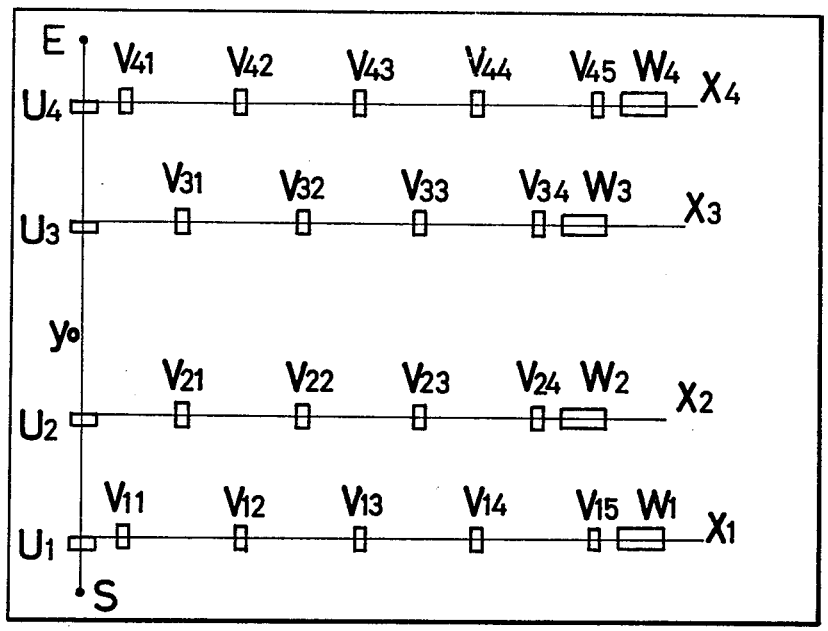
FIG. 5 is a front view of an embodiment of a marked plate according to the present invention.
Figure 6:
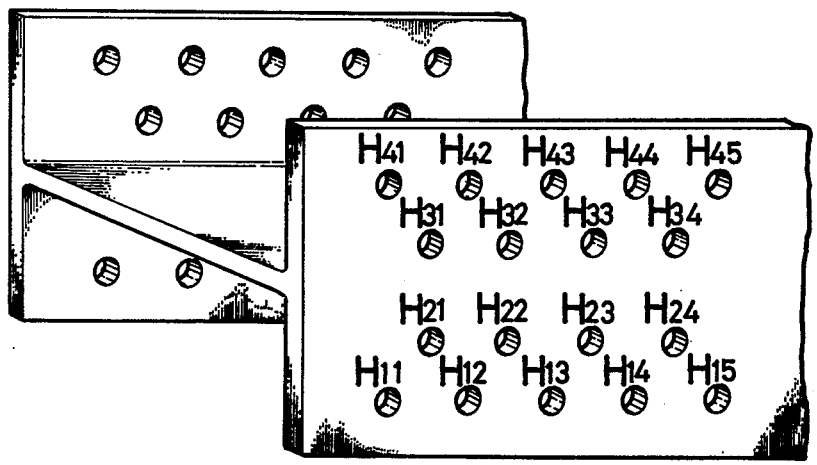
FIG. 6 is a perspective view of an H-shaped steel to be processed by means of the marked plate shown in FIG. 5.

An embodiment of the marked plate 18 is shown in FIG. 5, which has been designed to make rivet holes in shaped steel as shown in FIG. 6. In FIG. 5, marks $V_{11}$, $V_{12}, \ldots V_{44}, V_{45}$ are the first marks to indicate the hole making position. At the intersecting points of the limiting line yo and the four detecting lines $X_1$, $X_2$, $X_3$ and $X_4$ are located the upper edges of the second marks $U_1$, $U_2$, $U_3$ and $U_4$. Outside the area of the marked plate where the first marks are provided along the lines $X_1$, $X_2$, $X_3$ and $X_4$, the third marks $W_1$, $W_2$, $W_3$ and $W_4$ are provided. More particularly, each third mark is located on each detecting line at a position adjacent to the first mark farthest from the limiting line. Both the first mark V and the second mark U have a short width in the detecting direction, whereas the third mark W has a larger width.

The operation of the embodiment is explained below, with reference to FIGS. 3 to 6. The mark detector 19 is driven to rise along the limiting line yo from the starting point S by the oil pressure cylinder 28 in response to the limitation signal $LX_1$ from the limit switch 12A. When the mark detector 19 has reached the second mark $U_1$, the control unit 25 causes the oil pressure cylinder 28 to decelerate and stop in response to the mark signal Q and the detection-finished signal S based on the mark $U_1$, respectively. Then, the control unit 25 in turn causes the oil pressure cylinder 27A, accordingly the X-slide saddle 8A, to drive to the right along the detecting line $X_1$.

When the mark detector 19 has detected the first mark $V_{11}$, the oil pressure cylinder 27A causes the X-slide saddle 8A to decelerate and to stop in response to the mark detecting signal Q and the detection-finished signal S based on the mark $V_{11}$, so that the drill 11A makes a hole $H_{11}$. After the hole making head has been detected to be at the original position by the limit switch 17A, the oil pressure cylinder 27A is again driven to advance the X-slide saddle 8A to the right. Similarly, the holes $H_{12}$ to $H_{15}$ are made according to the marks $V_{12}$ to $V_{15}$.

When the third mark $W_1$ has been detected, the mark is judged as the third mark by discriminating the mark from the first and second marks in comparison with a continuation of the mark detecting signal. More particularly, the timer device 26 as the return signal means provides the return signal T because the period of time of deceleration is longer than the predetermined value, and the control unit 25 in turn causes the oil pressure cylinder 27A to drive in the opposite direction in response to the signal T, irrespective of the marks. It is detected by the limitation signal $LX_1$ that the mark detector has come back to the limiting line yo.

Then, the mark detector again turns to rise along the line yo and, when it stops at the mark $U_2$, detection and hole making for the second line $X_2$ is effected, similarly to the case of the first line $X_1$, followed by the detection and hole making for the third line $X_3$ and the fourth line $X_4$ in the same way. When the mark detector 19 rises again and reaches the position E, however, the hole making head actuates the upper Y-direction limit switch 14 so that the hole making head takes a turn for the downward direction to return to its original starting position.

As above mentioned, the mark detector scans the stationary marked plate not in zigzag manner but in a fixed direction row by row. As a result, overrunning of the mark detector, or the drill head occurs in that fixed direction should it occur. Also, the mark detector is caused to return to the initial position on the limiting line immediately after the drilling has been completed on a row to scan the next row.

The hole making position control unit according to the present invention is such as above described, and it can be used for making holes in splice plates of shaped steel, as well as for rivet hole making in shaped steel. In the case where rivet arrangements at both ends of shaped steel are of symmetrical type, a hole making machine can safely be used as it is only by turning the marked plate inside out.

What is claimed is:

1. A hole making position control unit for a hole making machine having a hole making tool, and wherein a fixedly placed material is drilled therein to produce a hole by the hole making tool, comprising:
   at least one marked plate having first marks arranged along detecting lines on said marked plate each in correspondence to each hole making position, and a second mark at each point where each said detecting line intersects with a limiting line at one end of each said detecting line;
   a mark detector fixedly connected with said hole making tool and driven along both said detecting lines and said limiting line above said marked plate, to produce mark signals when one of said first marks and one of said second marks is detected;
   an electric circuit device to produce mark detecting signals in response to said mark signals;
   return signals means to provide return signals after a series of holes have been made in said material in correspondence to each of said first marks on one of said detecting lines;
   limitation detecting means to provide limitation signals when said mark detector is along said limiting line;
   driving means to drive said mark detector; and
   control means for said driving means to cause said mark detector to be driven along said limiting line in response to said limitation signals, to cause said mark detector to be driven along said detecting line in response to said mark detecting signals due to said second mark, to cause said mark detector to stop upon cessation of said mark detecting signals due to said first mark for enabling said hole making tool to carry out a hole-making operation in said material, and to cause said mark detector to return along said detecting line to a starting position above the limiting line in response to said return signals.

2. A control unit as defined in claim 1, wherein:
   said marked plate has a third mark in addition to said first mark and said second mark, located on each said detecting line at a position adjacent to the one of said first marks farthest from said limiting line, each of said first marks and each said third mark having a set width along said detecting line, the width of said third mark being different from that of said first marks;

said mark detector produces continuous mark signals along said width of each said mark;

said return signals means produces said return signals by discriminating said third mark from said first mark in comparison with a continuation of said mark detecting signals; and, said control means for said driving means causes said mark detector to return along said detecting line to a starting position above said limiting line in response to said return signals.

3. A control unit as defined in claim 1, wherein:

said electric circuit device additionally produces detection-finished signals in response to cessation of said mark detecting signals; and, said control means for said driving means additionally causes said mark detector to reduce its speed in response to said mark detecting signals and stops said mark detector in response to said detection-finished signals.

4. A control unit as defined in claim 1, wherein:

said marked plate is a metallic plate having rectangular perforations to form said marks.

5. A control unit as defined in claim 1, having three said hole making tools, comprising:

three said marked plates each fixedly connected with one of said tools and each being independently driven by each said driving means, whereby each of said hole making tools carries out its individual hole-making operation in said material from the right side, from the left side and from above, respectively.

6. A control unit as defined in claim 1, including:

means to reduce the speed of said driving means on the basis of said mark detecting signals due to said first marks, and means to stop said driving means on the basis of a detection-finished signal produced in response to said first marks.

7. A control unit as defined in claim 1, wherein:

said limitation detecting means is responsive to said mark detector when reaching said limiting line, said second mark corresponding to the turning position arranged at said limiting line, whereby the mark detector moving along the limiting line switches its moving direction over to the direction of the hole making position detecting line upon the detection of said second mark.

8. A control unit as defined in claim 7, further comprising:

a third mark arranged outside the arranged area of said first mark and having a width in the detecting line different from that of the first mark;

said return signals means (to descriminate) providing said return signals by discriminating between said third mark and said first mark by comparison of the duration of time of mark detecting signals produced by each said mark, whereby after said mark detector moves along the hole making position detecting line and has detected the first mark, hole making is started, and after the mark detector has detected the third mark said mark detector activates said control means to switch the moving direction of said mark detector over to its returning direction.

9. A control unit as defined in claim 1, comprising:

means to fix a material to be processed, a cross-slide device to move on the designated plane, a hole making head mounted on said cross-slide device, a frame to fit said marked plate is parallel with said designated plane, said mark detector being interlocked with said hole making head to detect a mark provided on said marked plate, and said control means includes means to reduce the speed of movement of said cross-slide device by means of said limitation signal during the course of detecting and means to stop the movement of said cross-slide device by means of the mark detecting-finished signal.

10. A control unit as defined in claim 1, wherein:

the unit can operate independently in at least two directions of the upward direction, leftward direction and rightward direction of the fixedly placed material to be drilled.

* * * * *

UNITED STATES PATENT AND TRADEMARK OFFICE
CERTIFICATE OF CORRECTION

PATENT NO. : 4,098,556
DATED : July 4, 1978
INVENTOR(S) : Tadahiro Sugimoto

It is certified that error appears in the above-identified patent and that said Letters Patent are hereby corrected as shown below:

Col. 1, Line 24 "name a tool" should be --have a tool--

Line 33 "of detecting" should be --for detecting--

Lines 34 and 35 delete "However, these means have a disadvantage in like."

Line 40 "is" should be --are--

Col. 2, Line 28 "mark thereon" should be --marks thereon-- and "phtoelectric" should be --photoelectric--

Line 33 "The mark" should be --The marks--

Line 66 "slides on X an" should be --slides on an--

Lines 67 and 68 "the X-, Z-directions," should be --Z-directions,--

Col. 3, Line 17 "is a" should be --in a--

Line 62 after "particularly" insert a comma

Col. 4, Line 51 "switch-s" should be --switches--

Line 65 "signal is put out" should be --signal is not put out--

UNITED STATES PATENT AND TRADEMARK OFFICE
CERTIFICATE OF CORRECTION

PATENT NO. : 4,098,556
DATED : July 4, 1978
INVENTOR(S) : Tadahiro Sugimoto

It is certified that error appears in the above-identified patent and that said Letters Patent are hereby corrected as shown below:

Claim 9:

Col. 8, Line 29 "is" should be --in--

Line 35 change "limitation" to --detecting--

Signed and Sealed this

Tenth Day of June 1980

[SEAL]

Attest:

SIDNEY A. DIAMOND

Attesting Officer

Commissioner of Patents and Trademarks